United States Patent
Biesalski et al.

(10) Patent No.: US 9,580,563 B2
(45) Date of Patent: Feb. 28, 2017

(54) FIBER MAT REINFORCED RESIN COMPOSITE

(71) Applicant: UPM-KYMMENE CORPORATION, Helsinki (FI)

(72) Inventors: Markus Biesalski, Reinheim (DE); Matthias Rehahn, Fürth im Odenwald (DE); Roland Klein, Ober-Ramstadt (DE); Sabrina Mehlhase, Darmstadt (DE); Matthias Baaske, Neuenmarkt (DE); Jennifer Dietz, Darmstadt (DE); Samuel Schabel, Darmstadt-Eberstadt (DE); Henri Kröling, Darmstadt (DE); Andreas Büter, Darmstadt (DE); Johanna Fleckenstein, Weibersbrunn (DE); Narmin Nubbo, Bad Nauheim (DE); Frank Miletzky, Berg/Höhenrain (DE); Angelika Endres, München (DE); Michael Duetsch, Traunstein (DE); Okko Ringena, Neusäss (DE); Sanna Valkonen, Lappeenranta (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 0 days.

(21) Appl. No.: 14/899,299

(22) PCT Filed: Jun. 24, 2014

(86) PCT No.: PCT/FI2014/050505
§ 371 (c)(1),
(2) Date: Dec. 17, 2015

(87) PCT Pub. No.: WO2014/207308
PCT Pub. Date: Dec. 31, 2014

(65) Prior Publication Data
US 2016/0130412 A1  May 12, 2016

(30) Foreign Application Priority Data

Jun. 28, 2013 (FI) .................................. 20135716

(51) Int. Cl.
C08L 5/04 (2006.01)
C08J 5/04 (2006.01)

(52) U.S. Cl.
CPC .......... *C08J 5/045* (2013.01); *C08J 2363/00* (2013.01); *C08J 2401/02* (2013.01); *C08J 2497/00* (2013.01)

(58) Field of Classification Search
CPC ....................................................... C08J 5/045
USPC ....... 523/220, 440, 446, 448; 524/13, 35, 72
See application file for complete search history.

(56) References Cited

U.S. PATENT DOCUMENTS

| 4,320,036 A | 3/1982 | Gobran et al. |
| 5,833,883 A | 11/1998 | Afzali-Ardakani et al. |
| 2013/0005867 A1 | 1/2013 | Varnell |

FOREIGN PATENT DOCUMENTS

| DE | 19852029 A1 | 5/2000 |
| GB | 1038092 A | 8/1966 |

OTHER PUBLICATIONS

Wathén, R. Studies on fiber strength and its effect on paper properties, Doctoral Thesis, Helsinki University of Technology, Espoo, Nov. 24, 2006.
Mood et al., "Use of lignin as a compatibiliser in hemp/epoxy composites", Composites Science and Technology, 71: 1804-1810 (2011).
Amar K. Mohanty, et al., "Natural Fibers, Biopolymers, and Biocomposites", 2005, Taylor & Francis.
S. Y. Fu, et al., "Tensile properties of short-glass-fiber- and short-carbon-fiber-reinforced polypropylene composites", composites: Part A, 31 (2000) 1117-1125.

*Primary Examiner* — Edward Cain
(74) *Attorney, Agent, or Firm* — Nixon Peabody LLP; Leena H. Karttunen Contarino; Elizabeth Baio

(57) ABSTRACT

The present invention related to a fiber mat reinforced resin composite comprising a reinforcing constituent of fibers in the form of at least one mat embedded within a resin matrix. The invention further relates to a method for the production of a fiber mat reinforced resin composite.

15 Claims, 1 Drawing Sheet

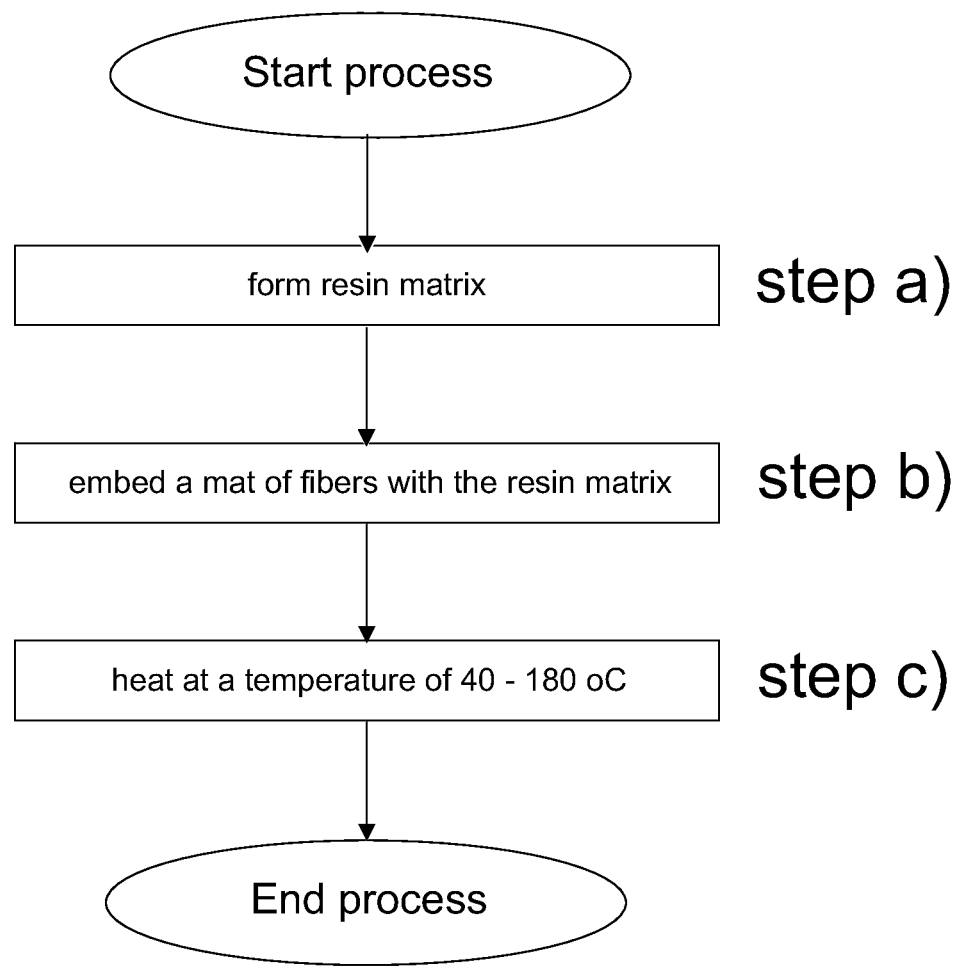

FIBER MAT REINFORCED RESIN COMPOSITE

CROSS-REFERENCE TO RELATED APPLICATIONS

This application is a National Phase Entry application under 35 U.S.C. §371 of International Application No. PCT/FI2014/050505 filed Jun. 24, 2014, which designates the U.S., and which claims priority to Finnish patent application No. 20135716, filed Jun. 28, 2013, the contents of which are incorporated herein in their entireties.

FIELD OF THE INVENTION

The present invention relates to a fiber mat reinforced resin composite comprising a reinforcing constituent of fibers in the form of at least one mat embedded within a resin matrix. The present invention further relates to a method for producing such a fiber mat reinforced resin composite and to the use thereof.

BACKGROUND OF THE INVENTION

A composite refers to a material consisting of two or more individual constituents. A reinforcing constituent is embedded in a resin matrix to form the composite. Common composites are composed of glass or carbon fibers in a plastic resin. Natural fibers can also be used. Resins can be of the form of thermoset or thermoplastic materials which each have their own unique properties. Epoxy resins are also used for fiber reinforced composites. The resin matrix is usually formed of a resin and a curing agent. Polyamines, such as diethylenetriamine (DETA), triethylenetetramine (TETA), tetraethylenepentamine (TEPA), and ethyleneamine, can be used as curing agents for such resins. There is, however, a need for more sustainable and bio-based resin matrixes for reducing the use of petroleum based resins.

Lignin has previously been used in fiber reinforced resin composites for replacing part of e.g. the epoxy resin used. The inventors have, however, recognized the need for a more environmentally friendly fiber mat reinforced resin composite having properties suitable for further applications and for a method for producing such a composite.

PURPOSE OF THE INVENTION

The purpose of the present invention is to provide a new type of a fiber mat reinforced resin composite and a method for producing such a fiber mat reinforced resin composite. The purpose of the present invention is further to provide uses of the new fiber mat reinforced resin composite.

SUMMARY

The fiber mat reinforced resin composite according to the present invention is characterized by what is presented in claim 1.

The method for producing the fiber mat reinforced resin composite according to the present invention is characterized by what is presented in claim 7.

The use of the fiber mat reinforced resin composite according to the present invention is characterized by what is presented in claim 11.

BRIEF DESCRIPTION OF THE DRAWINGS

The accompanying drawing, which is included to provide a further understanding of the invention and constitutes a part of this specification, illustrates an embodiment of the invention and together with the description helps to explain the principles of the invention. In the drawing:

FIG. 1 is a flow chart illustration of a method for producing a fiber mat reinforced resin composite according to one embodiment of the present invention.

DETAILED DESCRIPTION OF THE INVENTION

The present invention relates to a fiber mat reinforced resin composite comprising a reinforcing constituent of fibers in the form of at least one mat embedded within a resin matrix, wherein the resin matrix comprises thermoset resin and lignin crosslinked with a curing agent, and wherein the fibers are natural fibers having an average length of 150 µm-9 mm.

In the present invention a reinforcing constituent of natural fibers is in the form of at least one mat or sheet. The "fiber mat" or "mat of fibers" is embedded within the resin matrix to form the composite. The fibers can be oriented or non-oriented in the mat. In one embodiment of the present invention the thickness of the at least one fiber mat is below 2 cm, preferably below 1 cm, and more preferably below 800 µm.

The inventors of the present invention found out that lignin can be used to replace part of the thermoset resin needed for producing a fiber mat reinforced resin composite while retaining properties suitable for further application of the fiber mat reinforced resin composite. Thus, the ratio of bio-based material in the final fiber mat reinforced resin composite can be increased. In one embodiment of the present invention 5-60 weight-%, preferably 10-50 weight-%, and more preferably 30-40 weight-% of the thermoset resin, such as epoxy resin, in the composite is replaced with lignin. In one embodiment of the present invention the weight ratio of thermoset resin to lignin in the fiber mat reinforced resin composite is 19:1 to 2:3, preferably 9:1-3:2.

In one embodiment of the present invention lignin is penetrated between the fibers of the at least one mat of fibers.

The fibers used in the present invention are natural fibers. In this specification, unless otherwise stated, the expression "natural fibers" should be understood as fibers originating from a plant and/or animal source. In one embodiment of the present invention the natural fibers originate from a plant source. In one embodiment of the present invention the natural fibers are wood fibers, preferably cellulose fibers. In one embodiment of the present invention the natural fibers are cellulose fibers. In one embodiment of the present invention the natural fibers are obtained from wood, bast, straw, hemp, flax, kenaf, jute, coir, grass, cotton, sisal, leaf, cane or any combination thereof.

The natural fibers used in the present invention have an average fiber length of 150 µm-9 mm. The inventors of the present invention surprisingly found out that when the average fiber length is below 9 mm e.g. the flexibility or formability of the fiber mat, which has been embedded within the resin matrix that has not yet been cured, is improved compared to using fibers having an average length of above 9 mm. The inventors also found out that the sheet homogeneity, which leads to constant thickness and smooth surface of the composite, was improved when using a short fiber length. Also, the inventors of the present invention found out that, using natural fibers having an average fiber length of below 9 mm, does not compromise the tensile strength of the fiber mat, which remains equally good as when using longer fibers. In one embodiment of the present invention the fibers have an average length of 150 μm-4 mm.

The length of the natural fibers or fiber bundles used in the present invention is naturally within a wide length range. E.g. the length of fibers obtained from bast, straw, hemp, flax, kenaf, jute, coir, grass, cotton, sisal, leaf, or cane can vary from 0.5 cm to 20 cm. The length of the wood fibers, such as cellulose fibers, can depend on e.g. wood species, growing conditions, the delignification or pulping process and the following beating process that the fibers have been subjected to. Thus, in one embodiment of the present invention the natural fibers are subjected to fractionation, beating, refining, kneading, cutting and/or retting, before forming a fiber mat or sheet therefrom, in order to have an average fiber length of 150 μm-9 mm.

In this specification, unless otherwise stated, the expression "average length" or "average fiber length" should be understood as the length-weighted average fiber length. The length-weighted average fiber length can be determined with a Kajaani Fiberlab device by the method according to standard ISO 16065-1.

In one embodiment of the present invention the natural fibers are hardwood and/or softwood fibers, the zero span tensile index (ZSTI) of which is 30-200 Nm/g, preferably 60-170 Nm/g, and more preferably 80-160 Nm/g. The single fiber strength can be calculated by the zero span tensile index (ZSTI, ZST index). The advantage of high ZST index is that the tensile strength of the final composite is increased. The zero span tensile index (ZSTI) can be measured with a Pullmac device according to Tappi standard T 231 cm-96.

Standard paper making processes such as refining and fractionation can be used to treat softwood and/or hardwood pulp in order to achieve different paper, fiber and composite properties. Both processes may change the single fiber strength of softwood and hardwood fibers. The ZST index can be increased with refining. The inventors of the present invention surprisingly found out that refining can be used to affect the composite strength as it enhances the ZST index and the apparent density of e.g. paper.

In one embodiment of the present invention the formed fiber mat is calendered before being embedded within the resin matrix for adjusting the thickness of the fiber mat. The fiber volume in the final fiber mat reinforced resin composite can be increased by this procedure.

In one embodiment of the present invention the thermoset resin is epoxy resin. Epoxy resins are low molecular weight pre-polymers or higher molecular weight polymers which normally contain at least two epoxide groups. Epoxy resins are polymeric or semipolymeric materials. Epoxy resins can be produced industrially. The raw materials for epoxy resin production are usually petroleum derived, although plant derived sources are also commercially available, e.g. plant derived glycerol is used to make epichlorhydrin. Difunctional and multifunctional epoxy resins such as diglycidyl ether of bisphenol A (DGEBPA), triglycidyl p-amino phenol (TGAP), tetraglycidylether of 4,4'-diaminodiphenyl methane (TGGDDM), and epoxy novolacs can be mentioned as examples of epoxy resins that can be used in the present invention.

In one embodiment of the present invention the epoxy resin is a hot curing epoxy resin. In one embodiment of the present invention the epoxy resin is a cold curing epoxy resin.

In one embodiment of the present invention the curing agent is selected from a group consisting of anhydrides, imidazoles, and polymercaptan. In one embodiment of the present invention the curing agent is a polyamine curing agent. In one embodiment of the present invention the polyamine compound is selected from a group consisting of diethylenetriamine (DETA), triethylenetetramine (TETA), tetraethylenepentamine (TEPA), ethyleneamine, aminoethylpiperazine (AEP), dicyanamide (Dicy), diethyl toluene diamine (DETDA), dipropenediamine (DPDA), diethyleneaminopropylamine (DEAPA), hexamethylenediamine, N-aminoethylpiperazine (N-AEP), menthane diamine (MDA), isophoronediamine (IPDA), m-xylenediamine (m-XDA) and metaphenylene diamine (MPDA).

In this specification, unless otherwise stated, the expression "lignin" should be understood as lignin originating from any suitable lignin source.

The lignin used can be essentially pure lignin. By the expression "essentially pure lignin" should be understood as at least 90% pure lignin, preferably at least 95% pure lignin. In one embodiment of the present invention the essentially pure lignin comprises at most 10%, preferably at most 5%, of other components. Extractives and carbohydrates such as hemicelluloses can be mentioned as examples of such other components.

In one embodiment of the present invention the lignin is selected from a group consisting of kraft lignin, sulfonated lignin, lignosulfonate, sulfomethylated lignin, steam explosion lignin, biorefinery lignin, supercritical separation lignin, hydrolysis lignin, flash precipitated lignin, biomass originating lignin, lignin from alkaline pulping process, lignin from soda process, lignin from organosols pulping and combinations thereof. In one embodiment of the present invention the lignin is wood based lignin. The lignin can originate from softwood, hardwood, annual plants or from a combination thereof.

Different lignin components may have different properties, e.g. molecular weight, molar mass, polydispersity, hemicellulose and extractive contents and compositions.

By "kraft lignin" is to be understood in this specification, unless otherwise stated, lignin that originates from kraft black liquor. Black liquor is an alkaline aqueous solution of lignin residues, hemicellulose, and inorganic chemicals used in a kraft pulping process. The black liquor from the pulping process comprises components originating from different softwood and hardwood species in various proportions. Lignin can be separated from the black liquor by different, techniques including e.g. precipitation and filtration. Lignin usually begins precipitating at pH values below 11-12. Different pH values can be used in order to precipitate lignin fractions with different properties. These lignin fractions differ from each other by molecular weight distribution, e.g. Mw and Mn, polydispersity, hemicellulose and extractive contents. The molar mass of lignin precipitated at a higher pH value is higher than the molar mass of lignin precipitated at a lower pH value. Further, the molecular weight distribution of lignin fraction precipitated at a lower pH value is wider than of lignin fraction precipitated at a higher pH value.

The precipitated lignin can be purified from inorganic impurities, hemicellulose and wood extractives using acidic washing steps. Further purification can be achieved by filtration.

In one embodiment of the present invention the lignin is flash precipitated lignin. The term "flash precipitated lignin" should be understood in this specification as lignin that has been precipitated from black liquor in a continuous process by decreasing the pH of a black liquor flow, under the influence of an over pressure of 200-1000 kPa, down to the precipitation level of lignin using a carbon dioxide based acidifying agent, preferably carbon dioxide, and by suddenly releasing the pressure for precipitating lignin. The method for producing flash precipitated lignin is disclosed in patent application FI 20106073. The residence time in the above method is under 300 s. The flash precipitated lignin particles, having a particle diameter of less than 2 µm, form agglomerates, which can be separated from black liquor using e.g. filtration. The advantage of the flash precipitated lignin is its higher reactivity compared to normal kraft lignin. The flash precipitated lignin can be purified and/or activated if needed for the further processing.

In one embodiment of the present invention the lignin is separated from pure biomass. The separation process can begin with liquidizing the biomass with strong alkali or strong acid followed by a neutralization process. After the alkali treatment the lignin can be precipitated in a similar manner as presented above. In one embodiment of the present invention the separation of lignin from biomass comprises a step of enzyme treatment. The enzyme treatment modifies the lignin to be extracted from biomass. Lignin separated from pure biomass is sulphur-free and thus valuable in further processing.

By "sulfonated lignin" is to be understood in this specification, unless otherwise stated, lignin that can be received as a by-product from the production of wood pulp using sulfite pulping.

In one embodiment of the present invention the lignin is steam explosion lignin. Steam explosion is a pulping and extraction technique that can be applied to wood and other fibrous organic material.

By "biorefinery lignin" is to be understood in this specification, unless otherwise stated, lignin that can be recovered from a refining facility or process where biomass is converted into fuel, chemicals and other materials.

By "supercritical separation lignin" is to be understood in this specification, unless otherwise stated, lignin that can be recovered from biomass using supercritical fluid separation or extraction technique. Supercritical conditions correspond to the temperature and pressure above the critical point for a given substance. In supercritical conditions, distinct liquid and gas phases do not exist. Supercritical water or liquid extraction is a method of decomposing and converting biomass into cellulosic sugar by employing water or liquid under supercritical conditions. The water or liquid, acting as a solvent, extracts sugars from cellulose plant matter and lignin remains as a solid particle.

In one embodiment of the present invention the lignin is hydrolysis lignin. Hydrolysed lignin can be recovered from paper-pulp or wood-chemical processes.

In one embodiment of the present invention the lignin originates from an organosols process. Organosolv is a pulping technique that uses an organic solvent to solubilize lignin and hemicellulose.

The present invention further relates to a method for producing a fiber mat reinforced resin composite according to the present invention, wherein the method comprises the following steps:

a) forming a resin matrix by combining a thermoset resin, a curing agent, and lignin having an average particle size of 2-200 µm; and b) embedding at least one mat of fibers, wherein the fibers are natural fibers having an average length of 150 µm-9 mm, within the resin matrix.

In one embodiment of the present invention step a) is carried out at a temperature of at most 60° C., and preferably at a temperature of at most 40° C.

In one embodiment of the present invention the mat of fibers is embedded with the resin matrix by dipping the mat in the resin matrix, by applying the resin matrix on the mat, by impregnation, by wet hand lay-up, spray-up, by prepreg-lay-up, by vacuum bagging, by resin transfer moulding, by resin infusion, by pultrusion, by filament winding, by resin transfer moulding, by contact moulding, or by any combination thereof.

At least one mat of fibers is used in the present invention. In one embodiment of the present invention one mat of fibers is embedded within the resin matrix for forming a fiber mat reinforced resin composite. In one embodiment of the present invention two or more mats of fibers having been separately embedded within the resin matrix are bundled together. In one embodiment of the present invention two or more mats of fibers are bundled together before being embedded within the resin matrix.

In one embodiment of the present invention the method further comprises step c) of curing the resin matrix. In one embodiment of the present invention the method further comprises step c) of heating the at least one mat of fibers embedded within the resin matrix at a temperature of 20-200° C., and preferably at a temperature of 40-180° C., for curing the resin matrix. In one embodiment of the present invention step c) is carried out for 0.5-24 hours.

During the step of curing the resin matrix the thermoset resin and lignin are crosslinked with the curing agent, i.e. crosslinks are formed.

In one embodiment of the present invention the lignin used for producing the fiber mat reinforced resin composite is ground or milled such that its average particle size is 2-200 µm. Lignin can be ground by using e.g. a rotor mill, a hammer mill, a swirl fluidizer, and/or a cyclomix. The average particle size of lignin can be measured by a Beckman Coulter LS laser diffraction particle size analyzer. This analyzer has a measurement range of 0.4 to 2000 µm. This measurement technique is based on laser diffraction. The laser beam will scatter light at an angle that is directly related to the particle size. The result is a particle size distribution displayed as volume-% in discrete size classes.

In one embodiment of the present invention the glass transition temperature ($T_g$) of the lignin is 110-190° C., and preferably 130-170° C. The glass transition temperature is measured by differential scanning calorimeter (DSC), which defines glass transition as a change in heat capacity during the transition of the polymer matrix from glass state to rubber state. In one embodiment of the present invention the specific surface area (Brunauer-Emmet-Teller, BET) of the lignin is 0.1-10 $m^2/g$, and preferably 0.3-6.0 $m^2/g$. The BET method is a commonly used method to analyze the specific surface area of solid materials. The BET method is based on adsorption of gas on a surface and measures the amount of absorbed inert gas on the surface of the solid materials. When the amount of gas molecules adsorbed at a given pressure is known, the surface area of the analyzed material can be determined.

The inventors of the present inventors surprisingly found out that lignin having an average particle size of 2-200 µm enables the lignin in the resin matrix to penetrate within the fibers of the mat of fibers. A larger particle size may result in lignin particles being left only on the surface of the mat of fibers which may adversely affect the final composite e.g. by deteriorating the strength properties of the mat. A larger particle size may also break the resin matrix when cured. In one embodiment of the present invention the lignin has an average particle size of 5-150 µm, and preferably 10-100 µm.

The present invention further relates to the use of the fiber mat reinforced resin composite according to the present invention for the production of an aircraft, a boat, an automotive, a bath, a tank, a container, a sport or leisure product such as a surf board, a fishing rod, a ski and golf shaft, or a toy, an electronic or an electrical application such as a printed circuit board or an insulation, a roofing, a windmill blade, a pipe, a tube, a cable cover, a cladding, a cast, or a door. The fiber mat reinforced resin composite can be used in any applications where e.g. traditional fiberglass can be used.

The embodiments of the invention described hereinbefore may be used in any combination with each other. Several of the embodiments may be combined together to form a further embodiment of the invention. A composite, a method or a use, to which the invention is related, may comprise at least one of the embodiments of the invention described hereinbefore.

An advantage of the present invention is that a fiber mat reinforced resin composite with increased ratio of bio-based materials compared to traditional composites can be produced. An advantage of the present invention is that lignin can replace part of the petroleum based thermoset resin while the properties of the formed fiber mat reinforced resin composite are retained suitable for further applications. I.e. similar kinds of composite properties can be achieved with replacing part of the thermoset resin with lignin as when using only petroleum based components and materials.

An advantage of the present invention is that lignin is a readily available and inexpensive source material.

An advantage of the present invention is that the use of lignin in the resin matrix has a beneficial effect on the compatibility of the epoxy resin with the natural fibers.

An advantage of the fiber mat reinforced resin composite according to the present invention is that when using fibers having an average length of 150μm-9 mm the fiber mat can been manufactured with industrial scale paper machines which is not a case with longer fibers.

An advantage of the fiber mat reinforced resin composite according to the present invention is that it can be disposed by e.g. burning it whereby no waste material will remain from the composite. This is enabled by the fact that the natural fibers and the resin matrix will burn without leaving any waste material. For example glass fiber will result in inorganic material being left when burnt.

An advantage of the present invention is that the further handling of the formed composite such as cutting, drilling and/or sawing is easy and does not create e.g. health risks as the formed composite does not have e.g. sharp edges and does not cause the formation of mineral dust.

An advantage of the fiber mat reinforced resin composite is that it is lighter in weight than e.g. glass fiber based composites and is thus easy to handle for further applications.

EXAMPLES

Reference will now be made in detail to the embodiments of the present invention, examples of which are illustrated in the accompanying drawings.

The description below discloses some embodiments of the invention in such a detail that a person skilled in the art is able to utilize the invention based on the disclosure. Not all steps of the embodiments are discussed in detail, as many of the steps will be obvious for the person skilled in the art based on this specification.

FIG. 1 illustrates a method according to one embodiment of the present invention for producing a fiber mat reinforced resin composite.

Firstly, the source and type of components, and especially the source of lignin, is chosen. As presented above, lignin can be selected from e.g. kraft lignin, sulfonated lignin, steam explosion lignin, biorefinery lignin, supercritical separation lignin, hydrolysis lignin, flash precipitated lignin, biomass originating lignin, lignin from alkaline pulping process, lignin from soda process and from any combination thereof. The average particle size of lignin used in the present invention is 2-200 μm. The natural fibers used in the present invention have an average length of 150 μm -9 mm. Also the other components and their amounts to be used are selected.

Following the various preparations and pretreatments, in the embodiment of the present invention shown in FIG. 1, step a) is carried out. The selected lignin can be mixed with or dispersed into a mixture of thermoset resin and curing agent. Thus in step a) a resin matrix is formed.

After the resin matrix, is formed, step b) is carried out by embedding the mat of natural fibers within the resin matrix. After the mat of fibers has been embedded within the resin matrix, the formed composite can, in one embodiment of the present invention, be heated in step c) at a temperature of 20-200° C. for curing the resin matrix.

Example 1

Preparing a Cellulose Fiber Mat Reinforced Epoxy Resin Composite

In this example a cellulose fiber mat reinforced epoxy resin composite was prepared according to the embodiment of the present invention shown in FIG. 1. The following components and their amounts were used:

| | |
|---|---|
| Epoxy resin | 90 g |
| (Lange + Ritter GmbH) | LARIT L-285 |
| Epoxy curing agent | 30 g |
| (Lange + Ritter GmbH) | LARIT 287 - blau |
| Kraft lignin | 10 g |
| (Average particle size was 56 μm as measured by Coulter LS) | |
| Cellulose fiber mat | 5 mats |
| (Softwood fibers having an average fiber length of 2 mm (as measured with a Kajaani Fiberlab FS200 device)) | |

Firstly a resin matrix was prepared by mixing the epoxy resin with the curing agent. The lignin used in this example was simultaneously mixed into the resin system. The lignin could also have been mixed into the resin system after having firstly mixed the epoxy resin and the curing agent for a predetermined time.

After the resin matrix was formed each of the five cellulose fiber mats or sheets were impregnated with the resin matrix by a so-called hand lay-up process. The amount of resin matrix is dependent on the paper type and its specific absorption capacity. In the formed composite the fiber volume content was 40%.

After the cellulose fiber mats had been impregnated with the resin matrix, the impregnated mats or sheets were placed on top of each other and laminated. The formed fiber mat reinforced resin composite was then pressed and tempered for curing the resin matrix. Thereafter the formed composite was cut into test specimens. The dimensions of the bar shaped flat specimens were 150 mm (L)×20 mm (B)×2 mm (H). After cutting and prior to testing, the specimens were dried, polished, weighed and their dimensions measured.

The test specimens were subjected to a tensile test, which was conducted according to DIN EN ISO 527-4 "Test conditions for isotropic and orthotropic fiber-reinforced plastic composites". Through the tensile test Young's modulus, tensile strength, tensile strain at tensile strength were determined.

The values received from testing the formed cellulose fiber mat composite (CFC) were compared with values received from a corresponding glass fiber mat composite (GFC). Also values of a corresponding cellulose fiber mat composite (CFC), where no lignin had been used, were determined. The determined values are indicated in Table 1.

TABLE 1

Results of different fiber mat reinforced epoxy resin composites

| Composite sample | Number of mats | Thickness of the samples, cm | Young's modulus, MPa | Tensile stress, MPa | Tensile strain, % |
|---|---|---|---|---|---|
| CFC - 0% lignin | | | 6100 | 100 | 3.2 |
| CFC -10% of lignin | 5 | 2.52 | 6780 | 94 | 2.8 |
| GFC | 5 | 1.47 | 10659 | 171 | 2.88 |
| GFC - 10% of lignin | 5 | 1.63 | 8312 | 143 | 2.90 |
| GFC - 20% of lignin | 5 | 1.97 | 9360 | 146 | 2.97 |

From the values received it was noted that lignin could be used to replace epoxy resin in a fiber mat reinforced resin composite according to the present invention without compromising the properties of the final mat composite.

Example 2

Preparing Different Fiber Mat Reinforced Epoxy Resin Composites

In this example different fiber mat reinforced epoxy resin composites were prepared according to the embodiment of the present invention shown in FIG. 1. In this example the resin matrixes formed were the same but the fiber source and type was changed. The following components and their amounts were used:

| | |
|---|---|
| Epoxy resin | 182 g Epilox A 19-0 |
| Epoxy curing agent | 42.6 g Isophorondiamin |
| Kraft lignin (Average particle size was 45 μm as measured by Coulter LS) | 36 g |
| Cellulose fiber mat (Cellulose fibers having an average fiber length of 0.9 mm (as measured with a Kajaani Fiberlab FS200 device); the thickness of each of the fiber mats was 280 μm) | 7 mats |
| Oriented flax fiber mat (Flax fibers having an average fiber length of 4.0 mm (as measured with a Kajaani Fiberlab FS200 device); the thickness of each of the fiber mats was 800 μm) | 3 mats |
| Sisal fiber mat (Sisal fibers having an average fiber length of 6.2 mm (as measured with a Kajaani Fiberlab FS200 device); the thickness of each of the fiber mats was 800 μm) | 3 mats |

Firstly the resin matrix was prepared by mixing the epoxy resin with the curing. The lignin used in this example was simultaneously mixed into the mixture. The lignin could also have been mixed into the mixture after having mixed the epoxy resin and the curing agent for a predetermined time.

After the resin matrix was formed each fiber mat or sheet was impregnated with the resin matrix by a so-called hand lay-up process. The amount of resin matrix is dependent on the paper type and its specific absorption capacity. In the formed composite the fiber volume content was about 51% for the cellulose composite, about 16% for the flax composite and about 15% for the sisal composite.

After the fiber mats were impregnated with the resin matrix, the impregnated cellulose mats or sheets were placed on top of each other and laminated. In a similar manner the impregnated flax fiber mats were combined and laminated and also the sisal fiber mats were combined and laminated. The formed fiber mat reinforced resin composites were then each pressed and tempered for curing the resin matrix, after which the composites were cut into test specimens. The dimensions of the bar shaped flat specimens were 150 mm (L)×20 mm (B)×2 mm (H). After cutting and prior to testing, the specimens were dried, polished, weighed and their dimensions measured.

The test specimens were subjected to a tensile test, which was conducted according to DIN EN ISO 527-4 "Test conditions for isotropic and orthotropic fiber-reinforced plastic composites". Through the tensile test Young's modulus, tensile strength, tensile strain at tensile strength were determined.

The values received with the different fiber mat reinforced epoxy resin composites were compared. Also values of corresponding fiber mat composites, where no lignin had been used, were determined. The determined values are indicated in Table 2.

TABLE 2

Results of different fiber mat reinforced epoxy resin composites

| Composite sample | Number of mats | Thickness of the samples, cm | Young's modulus, MPa | Tensile stress, MPa | Tensile strain, % |
|---|---|---|---|---|---|
| CFC - 0% of lignin | 7 | 1.90 | 6900 | 90 | 3.8 |
| CFC - 20% of lignin | 7 | 1.97 | 6500 | 80 | 3.5 |
| Oriented Flax - 0% of lignin | 3 | 1.92 | 5800* | 70 | — |
| Oriented Flax - 20% of lignin | 3 | 1.95 | 5700* | 65 | — |
| Sisal - 0% of lignin | 3 | 2.0 | 6100 | 210 | 4.8 |
| Sisal - 20% of lignin | 3 | 2.1 | 5950 | 195 | 4.7 |

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A fiber mat reinforced resin composite comprising a reinforcing constituent of fibers in the form of at least one mat embedded within a resin matrix, characterized in that the resin matrix comprises thermoset resin and lignin crosslinked with a curing agent, and in that the fibers are natural fibers having an average length of 150 µm-9 mm.

2. The fiber mat reinforced resin composite as defined in claim 1, wherein the natural fibers are wood fibers.

3. The fiber mat reinforced resin composite as defined in claim 1, wherein the thermoset resin is epoxy resin.

4. The fiber mat reinforced resin composite as defined in claim 1, wherein the curing agent is a polyamine curing agent.

5. The fiber mat reinforced resin composite as defined in claim 1, wherein the fibers have an average length of 150 µm-4 mm.

6. The fiber mat reinforced resin composite as defined in claim 1, wherein lignin is penetrated between the fibers of the at least one mat.

7. A method for producing a fiber mat reinforced resin composite as defined in claim 1, characterized in that the method comprises the following steps:
 a) forming a resin matrix by combining a thermoset resin, a curing agent, and lignin having an average particle size of 2-200 µm; and
 b) embedding at least one mat of fibers, wherein the fibers are natural fibers having an average length of 150 µm-9 mm, within the resin matrix.

8. The method as defined in claim 7, wherein the method further comprises step c) of heating the at least one mat of fibers embedded within the resin matrix at a temperature of 40-180° C. for curing the resin matrix.

9. The method as defined in claim 7, wherein the lignin has an average particle size of 5-150 µm.

10. The method as defined in claim 7, wherein the natural fibers are hardwood and/or softwood fibers, the zero span tensile index (ZSTI) of which is 30-200 Nm/g.

11. The fiber mat reinforced resin composite as defined in claim 1 configured to be used for the production of an aircraft, a boat, an automotive, a bath, a tank, a container, a sport or leisure product, an electronic or an electrical application, a roofing, a windmill blade, a pipe, a tube, a cable cover, a cladding, a cast, or a door.

12. The fiber mat reinforced resin composite as defined in claim 2, wherein the wood fibers are cellulose fibers.

13. The method as defined in claim 9, wherein the lignin has an average particle size of 10-100 µm.

14. The method as defined in claim 7, wherein the natural fibers are hardwood and/or softwood fibers, the zero span tensile index (ZSTI) of which is 60-170 Nm/g.

15. The method as defined in claim 7, wherein the natural fibers are hardwood and/or softwood fibers, the zero span tensile index (ZSTI) of which is 80-160 Nm/g.

\* \* \* \* \*